Dec. 4, 1923.

J. R. VAN NAGELL 1,476,119

HOSE COUPLING

Filed Dec. 20, 1921

John R. van Nagell, Inventor

By Samuel Herrick, Attorney

Patented Dec. 4, 1923.

1,476,119

UNITED STATES PATENT OFFICE.

JOHN R. VAN NAGELL, OF RENO, NEVADA, ASSIGNOR TO CORA M. VAN NAGELL AND ALBERT W. EDWARDS, BOTH OF RENO, NEVADA.

HOSE COUPLING.

Application filed December 20, 1921. Serial No. 523,710.

*To all whom it may concern:*

Be it known that I, JOHN R. VAN NAGELL, a citizen of the United States, residing at Reno, in the county of Washoe and State of Nevada, have invented certain new and useful Improvements in Hose Couplings, of which the following is a specification.

This invention relates to a hose coupling and it has for its object to provide a very simple and inexpensive article of this nature adapted to be made from sheet metal at a very small cost and constructed in such manner as to provide an absolutely fluid-tight joint which may be connected by simply pressing the parts together and giving them a partial turn.

Further objects and advantages of the invention will be set forth in the detailed description which follows.

In the accompanying drawing.

Like numerals designate corresponding parts throughout the several figures of the drawing.

Figure 1:
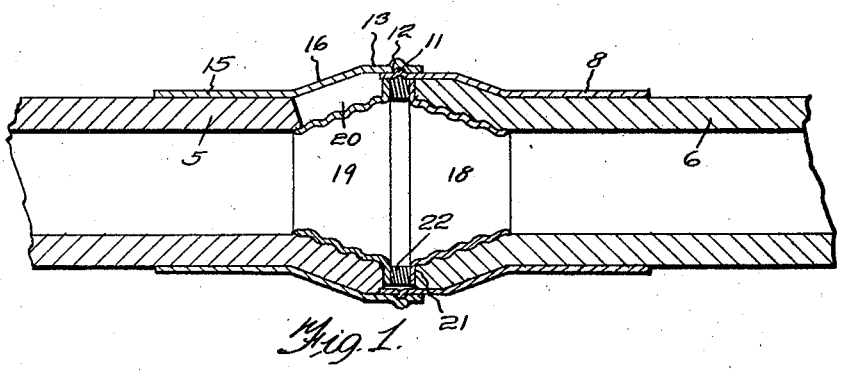
Fig. 1 is a longitudinal sectional view of a hose coupling constructed in accordance with the invention.
Figure 2:
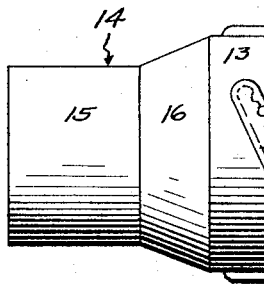
Fig. 2 is a side elevation of one of the members of the coupling.
Figure 3:
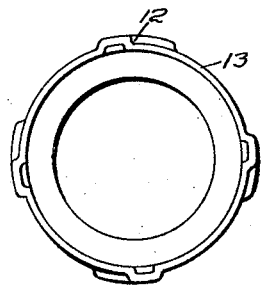
Fig. 3 is a front end elevation of the member shown in Fig. 2.
Figure 4:
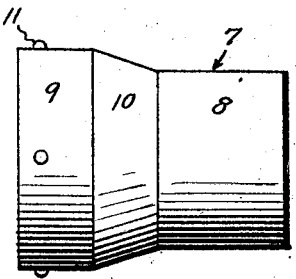
Fig. 4 is a side elevation of the other member of the coupling.
Figure 5:
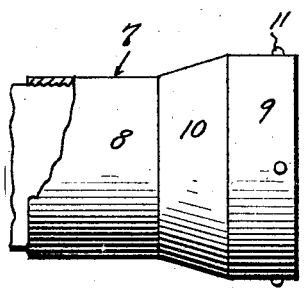
Fig. 5 illustrates an assembly of parts adapted to be used in connecting a hose to a nozzle or like element.
Figure 5:
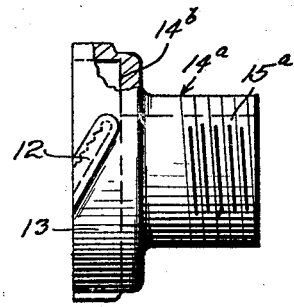
Figure 5:
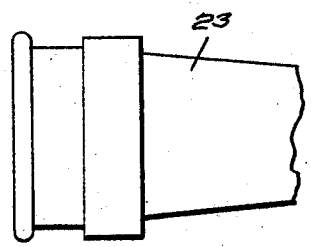

In the drawing 5 and 6 designate the two sections of hose to be connected. A male member 7 comprises a tubular portion 8 which has an internal diameter approximately equal to the external diameter of the hose, a rim 9 of larger diameter than the tubular portion 8 and a tapered or flaring connecting portion 10. The rim 9 has outstanding pins or studs 11 pressed therefrom, said pins or studs being adapted to enter oblique slots 12 pressed in the inner face of a rim portion 13 of a female member 14. The said female member 14 comprises a tubular portion 15 and a tapered connecting portion 16 corresponding to the parts 8 and 10 of the male member 7. The forward walls of the slots 12 are preferably notched or corrugated, as indicated at 17, so that the pins may snap thereinto and the part 7 be held against reverse rotation with respect to the part 14. Frusto, conical and corrugated sheet metal bushings 18 and 19 are inserted in the ends of the hose sections 5 and 6, said hose sections being longitudinally split with a sharp knife, as indicated at 20, to permit of their ends being flared by the insertion of the bushings therein. The bushings 18 and 19 are provided with outturned flanges 21 at their confronting ends between which a rubber gasket 22 is received. Therefore, it is manifest that the engagement of the studs 11 in the inclined slots 12 and rotation of the male member 7 with respect to the female member will draw these two members toward each other and will not only connect said members to each other but will bind the hose ends against the tubular bushings and will also exert a pressure upon the gasket 22 all in such manner as to insure an absolutely fluid tight joint. It will be observed that the construction is of such nature that the orifice through the hose is not constricted by the presence of the coupling but upon the other hand is enlarged. In the structure shown in Fig. 5 the member 7 is the same as that indicated in Fig. 4 but a female member 14$^a$ has been provided which differs slightly from the female member 14 in that its tubular portion 15$^a$ is externally threaded for the reception of a hose nozzle 23. In this case the gasket 22 merely bears against the wall 14$^b$ in a usual and well known way.

It will be observed that not only is the coupling extremely simple and inexpensive but that it is of such a nature that it may be attached to the hose without any tools except a knife and the fingers. No bands are required to hold it in place.

It is to be understood that the invention is not limited to the precise construction set forth but that it includes within its purview whatever changes fairly come within either the terms or the spirit of the appended claims.

Having described my invention what I claim is:

1. A sheet metal hose coupling comprising in combination a pair of sheet metal corrugated thimbles of frusto conical shape throughout their length having outturned circumferential flanges at their larger ends, a compressible gasket lying between said flanges, a sheet metal male and female member each comprising a hose encircling portion, a portion of larger diameter than the hose encircling portion and a flaring connecting portion conforming to the taper of the associated frusto conical thimble throughout the major portion of the length of the latter, the male member having outstanding projections upon its part of largest diameter and the female member having stamped cam recesses formed therein for the reception of said projections.

2. A hose coupling comprising in combination a pair of corrugated thimbles of frusto conical shape throughout their length having outturned circumferential flanges at their larger ends, a compressible gasket lying between said flanges, opposed male and female members each comprising a tapered portion which lies opposite to and conforms in taper to the associated frusto conical thimble throughout the major portion of the length of the latter and interengaging elements upon said male and female members adapted to draw them together to bind the hose between said thimble and the opposed portions of the male and female members upon turning movement of the male and female members with respect to each other.

In testimony whereof I affix my signature in the presence of two witnesses.

JOHN R. VAN NAGELL.

Witnesses:
PRINCE A. HAWKINS,
FLORENCE GORDON LEACH.